US006983147B1

(12) United States Patent
Hans et al.

(10) Patent No.: US 6,983,147 B1
(45) Date of Patent: Jan. 3, 2006

(54) METHOD OF TRANSMITTING SIGNALING INFORMATION, A MASTER STATION, A MOBILE STATION AND MESSAGE ELEMENTS

(75) Inventors: Martin Hans, Hildesheim (DE); Josef Laumen, Hildesheim (DE); Mark Beckmann, Hameln (DE); Volker Deichmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 398 days.

(21) Appl. No.: 10/088,146

(22) PCT Filed: Jun. 30, 2000

(86) PCT No.: PCT/DE00/02128

§ 371 (c)(1),
(2), (4) Date: Jul. 25, 2002

(87) PCT Pub. No.: WO01/17303

PCT Pub. Date: Mar. 8, 2001

(30) Foreign Application Priority Data

Aug. 30, 1999 (DE) ................................ 199 41 432
Sep. 8, 1999 (DE) ................................ 199 42 768

(51) Int. Cl.
*H04B 1/06* (2006.01)

(52) U.S. Cl. ........................ 455/436; 455/439; 370/331

(58) Field of Classification Search . 455/436–420,437, 455/438, 439, 442, 522; 370/331, 332

See application file for complete search history.

(56) References Cited

U.S. PATENT DOCUMENTS

| 4,386,589 A | * | 6/1983 | Hatz et al. ............... 123/192.2 |
| 5,893,035 A | * | 4/1999 | Chen .......................... 455/522 |
| 5,978,669 A | * | 11/1999 | Sanmugam .................. 455/410 |
| 6,047,177 A | * | 4/2000 | Wickman ................. 455/422.1 |
| 6,067,460 A | * | 5/2000 | Alanara et al. ............. 455/574 |
| 6,256,301 B1 | * | 7/2001 | Tiedemann et al. ......... 370/342 |
| 6,275,701 B1 | * | 8/2001 | Cerwall ...................... 455/436 |
| 6,377,563 B1 | * | 4/2002 | Jeon et al. .................. 370/335 |

FOREIGN PATENT DOCUMENTS

| EP | 0 888 026 | 12/1998 |
| WO | WO 98/23122 | 5/1998 |
| WO | WO 98/28888 | 7/1998 |
| WO | WO 99/35872 | 7/1999 |

OTHER PUBLICATIONS

"RRC Protocol Specification", TS 25.331 (Jan. 1, 2000) (3 GPP TSG RAN WG 1).

(Continued)

*Primary Examiner*—CongVan Tran
(74) *Attorney, Agent, or Firm*—Kenyon & Kenyon

(57) ABSTRACT

A method of transmitting signaling information between a master station and a slave station, a master station, a slave station, and various message elements are used to reduce the power consumption in a mobile slave station. A third message, which contains information regarding whether data to be sent is processed in the master station to increase the reception quality of this data at the slave station, is transmitted with the signaling information from the master station to the slave station.

44 Claims, 6 Drawing Sheets

U.S. PATENT DOCUMENTS 6,609,003 B1 * 8/2003 Park et al. .................. 455/436
6,667,965 B1 * 12/2003 Yamaura et al. ............ 370/347
6,708,041 B1 * 3/2004 Butovitsch et al. ......... 455/522
6,765,897 B2 * 7/2004 Cordier et al. .............. 370/342

OTHER PUBLICATIONS

"Summary of Joint Predistortion" (TSG-RAN WG 1).
"Signalubertragung," Luke, Springer-Verlag, $5^{th}$ Ed., 1991.

* cited by examiner

METHOD OF TRANSMITTING SIGNALING INFORMATION, A MASTER STATION, A MOBILE STATION AND MESSAGE ELEMENTS

FIELD OF THE INVENTION

The present invention relates to a method of transmitting signaling information between a master station and a slave station, a master station, a slave station and message elements.

BACKGROUND INFORMATION

"RRC Protocol Specification," TS 25.331 of Jan. 1, 2000, 3 GPP TSG RAN WG 1) describes that signaling information can be transmitted between a base station and a mobile station to set up at least one transmission channel between the base station and the mobile station dedicated specifically to data exchange between the base station and the mobile station. For such a transmission channel, the pulse response may be estimated, and the estimated pulse response may be used for predistortion of the signal to be transmitted, so that an arrangement for removing distortion may be omitted in the slave station. Such a method of predistortion is the joint predistortion method described in "Summary of Joint Predistortion", TSG-RAN WG1.

In use of such a predistortion method for transmission of data over the specially set-up data channel from the base station to the mobile station as described in "RRC Protocol Specification," the problem arises that it is not known in the mobile station whether or not the base station is transmitting the data predistorted over the at least one specially allocated transmission channel. Therefore, the mobile station cannot decide whether or not it must eliminate distortion from the data received by the base station over the specially set-up transmission channel.

SUMMARY

In an example method according to the present invention for transmitting signaling information, an example master station according to the present invention and an example slave station according to the present invention, a third message is transmitted with the signaling information from the master station to the slave station containing information regarding whether processing of data to be sent is performed in the master station or in an additional master station downstream from and assigned to the slave station to increase the reception quality of this data at the slave station. Thus, before setting up a transmission channel from the master station to the slave station, the slave station is able to decide how it may detect the data to be sent by the master station or the data to be sent by the other master station downstream from and assigned to the slave station in order to be able to guarantee optimum data reception. If the slave station determines that the data to be sent by the corresponding master station has already been processed in the corresponding master station, then it may omit a complicated distortion elimination because the data will arrive at the slave station with a suitably increased reception quality. Power consumption at the slave station may be minimized in this manner, which may be advantageous when configuring the slave station as a mobile station with battery operation.

Information regarding the type of processing of the data to be sent may be transmitted with the third message from the master station to the slave station. In this manner, any elimination of distortion, which may be necessary in the slave station, is further differentiated so that the distortion elimination in the slave station may be adapted to processing of the signals to be transmitted in a manner that is optimal for the transmission channel to be set up. Further optimization or minimization of the power consumption in the slave station may be achieved in this manner. Furthermore, it is possible to prevent faulty distortion elimination that is not adapted to the type of processing of data to be transmitted.

The third message with regard to multiple transmission channels for the transmission of the data to be sent is transmitted when the type of processing in these transmission channels is the same. This makes it possible to minimize the quantity of data necessary for transmission of the third message.

Together with the signaling information before the third message, a second message may be transmitted from the slave station to the master station containing information regarding which type(s) of processing of the data to be sent by the master station is/are supported by the slave station for detection of this data. This makes it possible to prevent the master station from processing the data to be sent to the slave station in a manner in which distortion may be eliminated by the slave station only to a limited extent or not at all. Instead, the master station may adapt the processing of the data to be sent to the slave station to the detection mechanisms or distortion elimination mechanisms supported by the slave station to guarantee an optimum transmission.

The signaling information may be transmitted in a processed form as the data to be sent from the master station to the slave station at the earliest when, on the basis of the second message, the type of processing supported by the slave station or the types of processing supported by the slave station is/are known at the master station, the processing occurring in a manner supported by the slave station, and when the third message has been transmitted to the slave station. In this manner, even before the special transmission channel from the master station to the slave station has been set up, signaling information may be processed in the master station so that its reception quality at the slave station is increased, and thus less complexity may be required for elimination of distortion in the slave station, so that it is possible to save on the cost of distortion elimination in the slave station at the earliest point possible and thus also reduce power consumption.

Together with the signaling information before the third message, a first message may be transmitted from the master station to the slave station containing information regarding which type(s) of processing of the data to be sent is/are supported by the master station. In this manner, the slave station is able to select a type of processing of the data to be sent and make known to the master station the selected type of processing by way of the second message. The selection may be made by the slave station in which a way as to permit detection and distortion elimination of the data to be transmitted from the master station in a manner that is as favorable as possible for it and saves on complexity and power consumption.

The first message, the second message and the third message may each be transmitted between the master station and the slave station via a message element and may thus be integrated easily into an existing signaling protocol.

DETAILED DESCRIPTION

Figure 1:
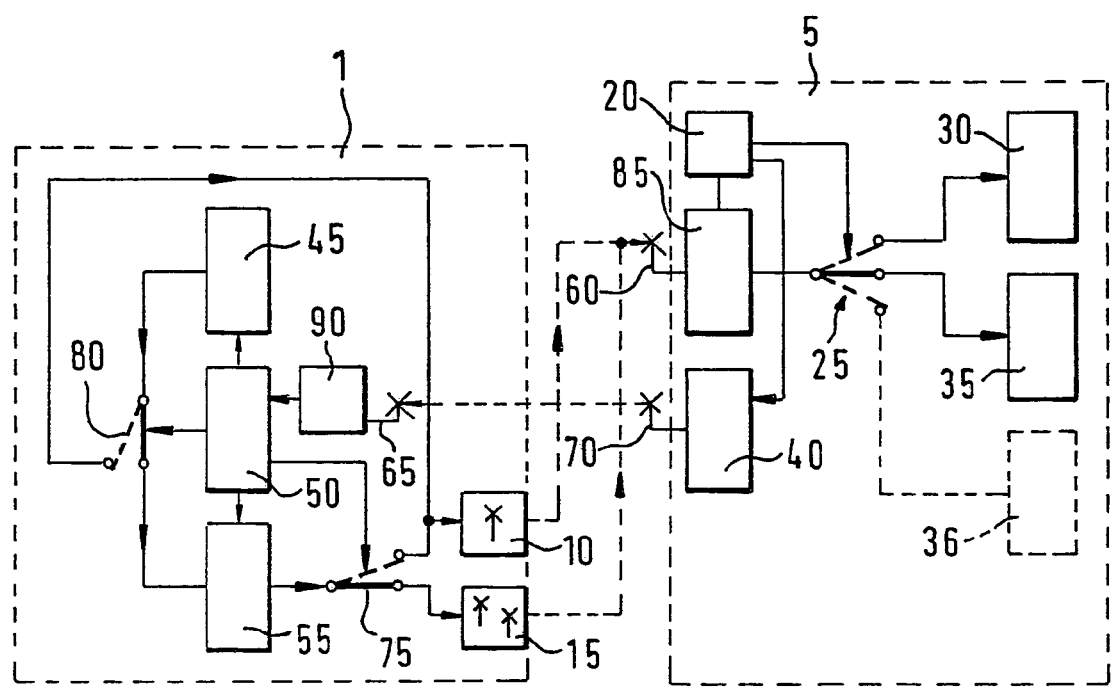
FIG. 1 is a block diagram illustrating an example master station and an example slave station according to the present invention.

FIG. 1 illustrates a master station 1 of a telecommunications network, which may be configured to be wireless or hardwired. FIG. 1 also illustrates a slave station 5 of the telecommunications network, which may be configured to be wireless or hardwired. Between master station 1 and slave station 5, at least one transmission channel may be set up which may also be wireless or hardwired depending on the configuration of master station 1 and slave station 5. Data is to be transmitted from master station 1 to slave station 5 over this at least one transmission channel, the at least one transmission channel being dedicated specifically to this data transmission from master station 1 to slave station 5. At least one separate transmission channel in each case may be set up for the transmission of data from master station 1 to other slave stations. Such a transmission channel which is dedicated to the transmission of data from master station 1 to a special slave station is also referred to below as a dedicated channel. When a transmission channel is mentioned below, it should be understood to refer to such a dedicated channel. To form such a dedicated channel, one or more physical resources may be used. These physical resources may include a frequency, a period of time, e.g., in the form of a time slot, a spatial sector, e.g., in the emission range of an antenna, a code, etc. If master station 1 supplies multiple slave stations with data, the individual transmission channels from master station 1 may be multiplexed, with the individual slave stations each being able to access the transmission channel assigned to them in accordance with the physical resources used according to a suitable channel access method to receive the data sent from master station 1 to these slave stations. Depending on the physical resources used, this channel access method may include a frequency division multiple access method (FDMA), a time division multiple access method (TDMA), a space division multiple access method (SDMA), a code division multiple access method (CMDA), etc. or any combination of these methods.

For example, master station 1 may be a base station and slave station 5 may be configured as a mobile station of a mobile wireless network. The at least one transmission channel to be set up between base station 1 and mobile station 5 is configured a wireless channel. The mobile wireless network, base station 1 and mobile station 5 may be configured, for example, according to the GSM standard (global system for mobile communications), the UMTS standard (universal mobile telecommunication system), etc. For example, the mobile wireless network, base station 1 and mobile station 5 may be configured according to the UMTS standard, and the mobile wireless network according to the UMTS standard may be based on a CDMA system in TDD mode (time division duplex). A half duplex connection is set up between base station 1 and mobile station 5, providing different time slots for the transmission from base station 1 to mobile station 5 and from mobile station 5 to base station 1. At least one time slot is provided for the transmission from base station 1 to mobile station 5. The data transmitted from base station 1 to mobile station 5 in this time slot is coded according to a CDMA code and modulated to a carrier frequency. The CDMA code, the time slot and the carrier frequency are each a physical resource, the combination of which forms a transmission channel from base station 1 to mobile station 5. Mobile station 5 includes a first receiving unit 85, which is connectable alternately to a first detection arrangement 30 or a second detection arrangement 35 over first selector arrangement 25. First analyzer arrangement 20 is connected to first receiving unit 85. First analyzer arrangement 20 activates first message generating arrangement 40, and first selector arrangement 25 activates mobile station 5. A first receiving antenna 60 is connected to first receiving unit 85, and a transmitting antenna 70, of mobile station 5, is connected to first message generating arrangement 40. First receiving antenna 60 and transmitting antenna 70 of mobile station 5 may also be combined via an antenna splitter, for example, and joined together to form a common transmitting/receiving antenna. Base station 1 includes a second analyzer arrangement 50, a second message generating arrangement 45 and a processing unit 55. A second receiving antenna 65 is connected to second analyzer arrangement 50 a second receiving unit 90. Processing unit 55 is optionally connectable to a first antenna unit 10 or to a second antenna unit 15, over second selector arrangement 75. Second message generating arrangement 45 is optionally connectable to first antenna unit 10 or to processing unit 55 over a third selector arrangement 80. First selector arrangement 25, second selector arrangement 75 and third selector arrangement 80 may each be a configured a controllable switch as illustrated in FIG. 1, first selector arrangement 25 being activated by first analyzer arrangement 20 and second selector arrangement 75 and third selector arrangement 80 being activated by second analyzer arrangement 50. First antenna unit 10 is configured a single transmitting antenna. Second antenna unit 15 includes at least two transmitting antennas and makes it possible to send out signals in a transmission diversity operation. With base station 1 it is also possible to combine transmitting and receiving antennas in the manner described with respect to mobile station 5 into one or (in the case of transmission diversity operation) multiple transmitting/receiving antennas by using an antenna splitter.

To set up at least one transmission channel from base station 1 to mobile station 5, first an exchange of signaling information between base station 1 and mobile station 5 may be necessary to cause the corresponding allocation of physical resources necessary to form the transmission channel. The present invention provides for the data that is to be sent from base station 1 to mobile station 5 over the transmission channel to be set up to be processed in base station 1 to increase the quality of reception of this data at mobile station 5. Detection of the data thus received then may require little or no additional complexity in mobile station 5, so that the power consumption in mobile station 5 is reduced and the standby time of mobile station 5 is increased. Mobile station 5 is capable of switching between two different detection arrangements 30, 35, depending on the quality with which the data is to be received from base station 1. However, to do so, mobile station 5 should know whether the data to be sent has been processed at all in base station 1. Therefore, before setting up the transmission channel, a third message is transmitted from base station 1 to mobile station 5 with the signaling information, containing information regarding whether processing of the data to be sent is performed in master station 1. The third message is generated by second message generating arrangement 45 and emitted over third selector arrangement 80 and first antenna unit 10 to first receiving unit 85. First analyzer arrangement 20 then checks on the basis of the third message to determine whether processing of the data to be sent is performed in base station 1. If this is the case, then first detection arrangement 30 is selected for the detection. Otherwise, second detection arrangement 35 is selected for the detection. Optionally, the data to be sent may be processed in base station 1 in various manners. Then, with the third message, information regarding the type of processing of the data to be sent is also transmitted from base station 1 to slave station 5. To this as indicated with dotted lines in FIG. 1, mobile station 5 may include third detection arrangement 36, which may also be connectable to first receiving unit 85 over first selector arrangement 25. First analyzer arrangement 20 checks first on the basis of the third message whether the data to be sent has already been processed in base station 1. If this is not the case, then first analyzer arrangement 20 causes first selector arrangement 25 to connect first receiving unit 85 to second detection arrangement 35. Otherwise, first analyzer arrangement 20 checks on the basis of the third message to determine the type of processing of the data to be sent in base station 1. Depending on the type of processing, first analyzer arrangement 20 may then cause first selector arrangement 25 to connect first detection arrangement 30 or third detection arrangement 36 to first receiving unit 85. The data to be sent from base station 1 is then detected by the detection arrangement connected to first receiving unit 85.

It is possible to provide for the data to be sent from base station 1 to mobile station 5 to be transmitted in a single dedicated transmission channel. However, it is also possible for multiple dedicated transmission channels may to be set up for the transmission. The third message is then transmitted individually from base station 1 to first analyzer arrangement 20 over first receiving unit 85 for each transmission channel to be set up. This may be performed e.g., if the data to be sent in the various transmission channels is to be processed by different methods in base station 1 or if data without processing is to be sent in one transmission channel and data with processing is to be sent in another transmission channel. However, if data without processing is to be transmitted from base station 1 to mobile station 5 in multiple transmission channels or if data processed according to the same method is to be transmitted in various transmission channels, then it is also possible for a single third message with regard to multiple transmission channels to be transmitted from base station 1 to mobile station 5 if the type of processing in these transmission channels is the same or if no processing occurs in these transmission channels.

Processing of the data to be sent may occur in base station 1 in various manners. First, the data to be sent from base station 1 may be emitted using a transmission diversity method by first antenna unit 10 having one transmitting antenna or by second antenna unit 15 having multiple transmitting antennas. Use of first antenna unit 10 having one transmitting antenna represents the traditional case without processing of the data to be sent. When using second antenna unit 15 having multiple transmitting antennas, a multiway reception is generated in mobile station 5 through which signal dips or fading on one or more of the reception pathways may be compensated by a reception pathway without fading. Thus, with the third message it is possible to transmit information regarding whether the data to be sent from base station 1 is to be emitted by first antenna unit 10 or by second antenna unit 15. If the data to be sent is emitted by first antenna unit 10, first analyzer arrangement 20 causes second detection arrangement 35 to be connected over first selector arrangement 25 to first receiving unit 85. Otherwise, third detection arrangement 36 is connected to first receiving unit 85 over first selector arrangement 25. Second detection arrangement 35 then performs distortion removal and detection on the received data in a conventional manner, e.g., according to a joint detection method (JD). Such a method is described in "System Description Performance Evaluation," Concept Group Delta WB-TDMA/CDMA, ETSI, SMG2. This method includes a combined cancellation of multiple user interference and intersymbol interference. Multiple user interference occurs due to mutual influencing of codes assigned to different mobile stations in transmission over multiplexed transmission channels. Intersymbol interference occurs due to multiway propagation of signals in the radio channel.

Third detection arrangement 36 may also operate according to a JD method adapted to second antenna unit 15 used with regard to the estimate of the pulse response of the transmission channels used, which may be necessary for removing distortion.

Processing of the data to be sent from base station 1 may also occur by predistortion of the data to be sent in processing unit 55. The predistortion is then compensated by the properties of the transmission channel to be set up in comparison with second detection arrangement 35 so that the data to be sent from base station 1 arrives undistorted at first receiving unit 85 and thus distortion removal may no longer be necessary in mobile station 5. The data received may then be detected by first detection arrangement 30, e.g., simply by correlation reception, to which end first detection arrangement 30 is to be connected to first receiving unit 85 over first selector arrangement 25.

First detection arrangement 30 may thus be configured merely as a correlation receiver, e.g., according to a "matched filter" concept such as that described in "Signalübertragung,", Lüke, Springer-Verlag, 5th edition, 1991 because it detects suitably processed data from base station 1 arriving undistorted and therefore with a high reception quality at mobile station 5.

However, if the data is sent from base station 1 without predistortion to mobile station 5 over first antenna unit 10, the data reaches first receiving unit 85 with distortion and should be sent to second detection arrangement 35 for distortion removal at an increased outlay. This is much less complex and consumes less power than a strict correlation reception, for example, with first detection arrangement 30. Either the third message is omitted in this case or the third message in this case contains information indicating that no processing occurs in the base station.

An even higher reception quality may be achieved if the predistortion is linked to the emission over second antenna unit 15 so that the signals to be sent arrive at first receiving unit 85 not only without distortion but also without signal dips or fading. In this case, only first detection arrangement 30 may be connected with strict correlation reception to first receiving unit 85 over first selector arrangement 25, for example. Then with the third message, information is transmitted indicating that the data to be sent from base station 1 is emitted by second antenna unit 15 and a predistortion of the data sent is performed in base station 1.

First selector arrangement 25 for connecting the corresponding detection arrangement to first receiving unit 85 is controlled by first analyzer arrangement 20 after analysis of the corresponding third message.

With the CDMA system in TDD mode described here, the joint predistortion method (JP), as described in "Summary of Joint Predistortion", may be used for performing predistortion. Accordingly, with the third message, information regarding whether predistortion is performed by the JP method for the data to be sent is transmitted from base station 1 to mobile station 5. In the JP method, base station 1 estimates the pulse response of the transmission channel from mobile station 5 to base station 1 by way of the time slots used for the transmission from mobile station 5 to base station 1. This estimate may also be used for the transmission channel to be set up from base station 1 to mobile station 5 because in TDD mode the transmission properties of the two transmission channels are essentially the same in the forward and return directions, and there are no frequency differences. The data to be sent is then folded with the inverse estimated pulse response before being transmitted to mobile station 5, and thus it is predistorted.

It is possible to provide for second message to be transmitted from mobile station 5 to base station 1 with the signaling information before the third message containing information regarding which type(s) of processing of the data to be sent from base station 1 is/are supported by mobile station 5 for detection this data. The second message is generated by first message generating arrangement 40 and emitted by transmitting antenna 70 of mobile station 5 to base station 1 where it is received by second receiving unit 90 over second receiving antenna 65 and forwarded to second analyzer arrangement 50. The types of processing supported by mobile station 5 depend on detection arrangements 30, 35, 36 connectable to first receiving unit 85 over first analyzer arrangement 25 in mobile station 5. Thus, in this example embodiment of the present invention, the second message may contain the information that detection in mobile station 5 is possible by strict correlation reception and detection with prior distortion removal according to a joint detection method in two different stages with regard to the outlay for error detection and/or correction. Second analyzer arrangement 50 analyzes the second message to determine which type(s) of processing of signals to be sent is/are supported by mobile station 5. Second analyzer arrangement 50 then checks whether this type or these types of processing is/are also supported by base station 1. In this example embodiment of the present invention, second analyzer arrangement 50 ascertains that the detection offered by mobile station 5 is compatible, for example, with processing by predistortion and/or by predistortion and transmission diversity operation through strict correlation reception. In addition, second analyzer arrangement 50 ascertains on the basis of the second message that the data to be sent may not be sent to mobile station 5 or may be sent only in a partially processed form by transmission diversity operation because with the joint detection method the signals that are distorted on the transmission channel to be set up and are influenced to a greater or lesser extent by fading may be subjected to distortion removal and detected. Second analyzer arranges 50 in this example embodiment ascertain that the types of processing supported by mobile station 5 are also supported by base station 1. Second analyzer arrangement 50 then selects at least one type of processing, which is supported by both base station 1 and mobile station 5, and activates second message generating arrangement 45 so that at least one selected type of processing is indicated in the third message. In addition, second analyzer arrangement 50 activates processing unit 55 and second selector arrangement 75 so that they process the data to be sent according to the at least one selected type of processing. Thus, for example, if second analyzer arrangement 50 ascertains on the basis of the second message that mobile station 5 supports detection with strict correlation reception, it causes processing unit 55 to predistort the signals to be sent and causes second selector arrangement 75 to connect second antenna unit 15 or first antenna unit 10 to processing unit 55. In addition, second analyzer arrangement 50 then causes second message generating arrangement 45 to generate a third message containing information regarding the fact that the data to be sent is predistorted and is emitted over one or more antennas. If the JP method is used for predistortion, this may also be indicated in the third message.

This choice of processing of the data to be sent lead to minimal complexity in mobile station 5 for detection of the data received and to a minimal power consumption.

It is also possible to provide for a first message to be transmitted from base station 1 to mobile station 5 together with the signaling information before the third message this first message containing information regarding which type(s) of processing of the data to be sent is/are supported by base station 1. To do so, second message generating arrangement 45 generates the first message before transmitting the third message and transmits it to mobile station 5. In this example embodiment, the first message contains information regarding the fact that the data to be sent may be emitted without predistortion and with only one transmitting antenna to mobile station 5. In addition, the first message includes information regarding the fact that data to be sent from base station 1 may be emitted with predistortion and by only a single transmitting antenna. In addition, the first message contains information regarding the fact that the data to be sent may be emitted from base station 1 with predistortion and using multiple antennas. In addition, the first message contains information regarding the fact that the data to be sent may be emitted without predistortion but by multiple antennas. Thus four different types of processing are possible in base station 1 and are contained as information in the first message. The lack of processing of data without predistortion and the use of only one transmitting antenna is also counted as a type of processing. The first message thus generated is received in first receiving unit 85 of mobile station 5 and relayed to first analyzer arrangement 20 for analysis. First analyzer arrangement 20 then analyzes the first message to determine which type(s) of processing of signals to be sent is/are supported by base station 1. First analyzer arrangement 20 then checks whether this type or these types of processing is/are also supported by mobile station 5. In this example embodiment of the present invention, first analyzer arrangement 20 ascertains that the processing by predistortion with or without transmission diversity operation is supported by mobile station 5 through first detection arrangement 30 with strict correlation reception. In addition, first analyzer arrangement 20 ascertains that the lack of processing without predistortion and using only one transmitting antenna is supported by second detection arrangement 35 by using the joint detection method. In addition, first analyzer arrangement 20 ascertains that processing without predistortion and with transmission diversity operation is supported by third detection arrangement 36 by using the joint detection method.

First analyzer arrangement 20 activates first message generating arrangement 40 so that at least one type of processing is indicated in the second message that is supported by both base station 1 and mobile station 5. In this example embodiment of the present invention, first analyzer arrangement 20 activates first message generating arrangement 40 so that the second message may include information the fact that detection with strict correlation reception is possible. The second message may also include information regarding the fact that detection with prior distortion removal by the joint detection method is possible. However, if the latter types of information regarding possible distortion removal by the joint detection method are not included in the second message, then it is certain that base station 1 will provide processing of the data to be sent, permitting detection with strict correlation reception in mobile station 5 and thus minimizing the power consumption in mobile station 5.

Optionally it is also possible to provide for the signaling information itself to be transmitted from base station 1 to mobile station 5 in processed form as the data sent to be sent. However, this may occur at the earliest, when the type of processing supported by mobile station 5 or the types of processing supported by mobile station 5 is/are known at base station 1 on the basis of the second message, the processing occurring according to at least one type supported by mobile station 5. Before transmission of processed signaling information to mobile station 5 base station 1 also transmits a corresponding third message to mobile station 5, to inform mobile station 5 promptly regarding the type of processing used, so that before transmission of the processed signaling information, mobile station 5 is able to set first selector arrangement 25 accordingly to connect the required detection arrangement to first receiving unit 85. In this manner it is also possible to save on power consumption at mobile station 5 in the transmission of signaling information to mobile station 5, e.g., when the signaling information is processed so that first detection arrangement 30 using strict correlation reception may be used for detection of the received signaling information. In this example embodiment of the present invention, the signaling information may be processed in base station 1 so that it is predistorted, for example, and emitted over one or more transmitting antennas. Detection in mobile station 5 then occurs by connecting first detection arrangement 30 to first receiving unit 85 over first selector arrangement 25, so that strict correlation reception is possible.

Starting from the time when the signaling information is transmitted in processed form from base station 1 to mobile station 5, second analyzer arrangement 50 causes third analyzer arrangement 80 to interrupt the connection of second message generating arrangement 45 to first antenna unit 10 and connect second message generating arrangement 45 to processing unit 55. The processing is then performed as described above, in general for the data to be sent. All the messages generated subsequently for the signaling information by second message generating arrangement 45 are then sent in processed form to mobile station 5 according to the selected type or types of processing.

For the case when the data to be sent is not predistorted in processing unit 55 but instead is processed only by being emitted over multiple antennas it is also possible to provide for the data which is to be sent be only routed through processing unit 55 in a transparent form.

The data to be sent in processed form may be transmitted in a transmission channel dedicated only to the connection between base station 1 and mobile station 5. In the case of a predistortion performed in processing unit 55, this may be indispensable according to the joint predistortion method because this predistortion is only characteristic of the dedicated forward and reverse channels between base station 1 and mobile station 5 and not characteristic of channels that are used jointly by multiple mobile stations. Suitably processed signaling information may also be transmitted in the transmission channel dedicated only to the connection between base station 1 and mobile station 5. However, this may occur at the earliest after transmission of the third message from base station 1 to mobile station 5 because only then this is transmission channel set up. First the signaling information is transmitted in a channel accessible to multiple mobile stations. This is then also true of transmission of the first message which is transmitted before the third message.

The first message, the second message and the third message are each transmitted in the form of a message element as part of the signaling information. Such a message element may be inserted into the existing protocols for exchange of signaling information.

The signaling information to be sent from base station 1 to mobile station 5 is generated by second message generating arrangement 45 and is emitted by first antenna unit 10 to mobile station 5 over a channel used jointly by multiple mobile stations as long as the dedicated transmission channel to be set up between base station 1 and mobile station 5 still exists, the additional signaling information is sent to mobile station 5 by second message generating arrangement 45 over processing unit 55 and either first antenna unit 10 or second antenna unit 15. To generate the messages necessary for the signaling information, second message generating arrangement 45 is activated by second analyzer arrangement 50, which includes a radio resource control RRC. By way of RRC, the operator of the mobile wireless network makes a decision regarding the allocation of the respective physical resources to the setting up of the dedicated transmission channel from base station 1 to mobile station 5. Thus, the physical resources of the transmission channel to be set up are managed in RRC. Whether and when base station 1 will perform joint predistortion in a time slot transmission channel, for example, is thus decided by the operator of the mobile wireless network over RRC. Information regarding which physical resources are allocated by RRC to which mobile station and by which method is relayed to the respective mobile stations by RRC by using the signaling information to be formed in second message generating arrangement 45. The messages to be formed for this signaling information and the associated message elements are described, for example, in "RRC Protocol Specification."

Figure 2:
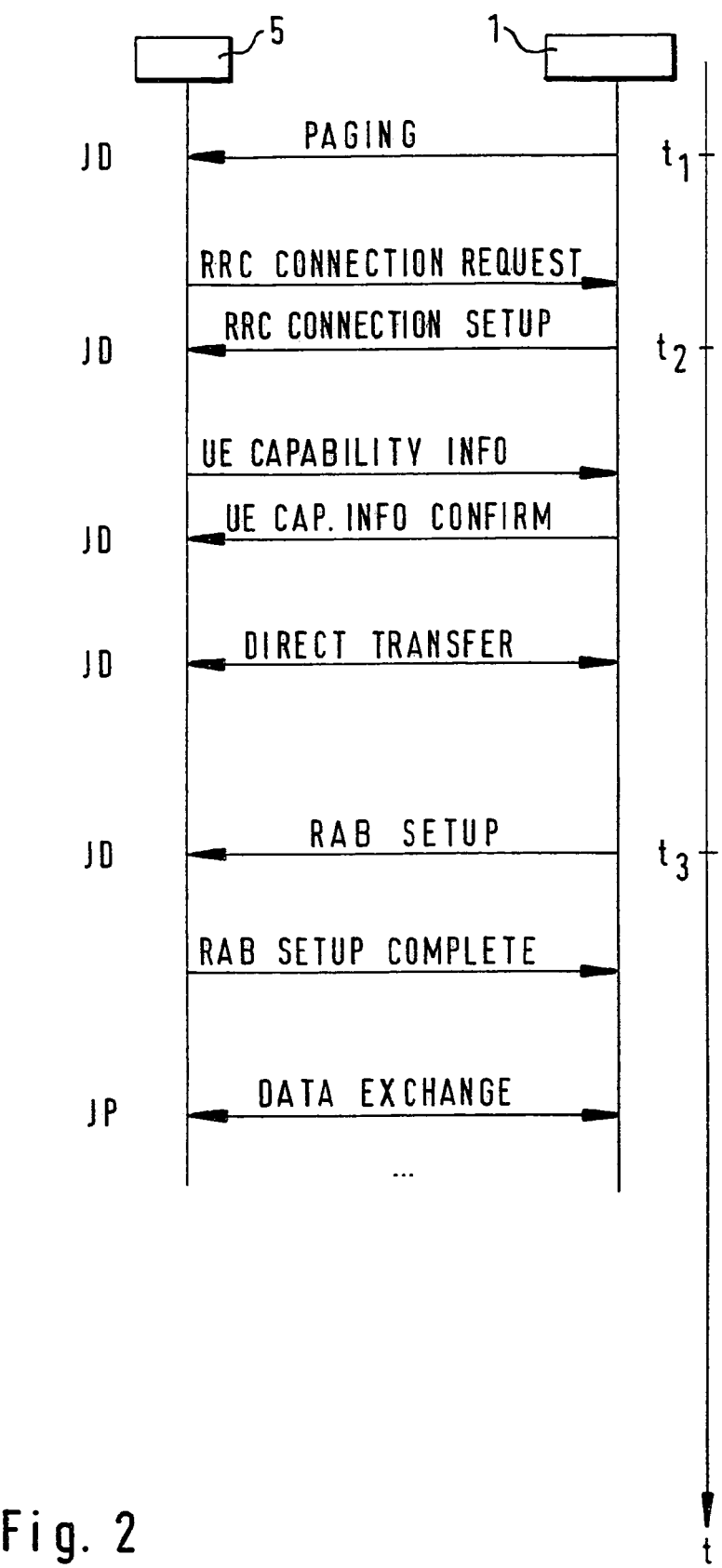
FIG. 2 is a flow chart illustrating the exchange of signaling information according to a first example embodiment of the present invention.

FIG. 2 illustrates a possible signaling scenario plotted over a time axis representing the signaling information to be exchanged between base station 1 and mobile station 5 as a function of time.

Generation of the signaling information to be sent from mobile station 5 to base station 1 may be controlled by first message generating arrangement 40 through first analyzer arrangement 20. The signaling information of mobile station 5 is analyzed by second analyzer arrangement 50 in base station 1, and the signaling information from base station 1 is analyzed by first analyzer arrangement 20 in mobile station 5.

The signaling scenario illustrated in FIG. 2 is described for an incoming telephone call to mobile station 5 in an "idle mode" in which there is neither a data transmission between mobile station 5 and base station 1 nor is the exact location of mobile station 5 known to the mobile wireless network. In this idle mode, mobile station 5 may be localized only approximately in the mobile wireless network. Multiple radio cells spanning from one base station in each case are combined to form a localization area, each with the location of mobile station 5 in such a localization area being known. If mobile station 5 leaves one localization area to enter another localization area, it will notify the network operator of this. If mobile station 5 which may be configured as a cellular telephone, for example, is called up and is in idle mode, base station 1 will first send a "paging" message to mobile station 5 over a paging channel PCH because mobile station 5 is reachable most easily in this manner because of its only approximate localization in idle mode. A connection from base station 1 to mobile station 5 is referred to below as a downlink and a connection from mobile station 5 to base station 1 is referred to as an uplink. The paging channel thus represents a downlink connection. Over this paging channel, mobile station 5 is signaled regarding the incoming call. The "paging" message goes at a first time $t_1$ to mobile station 5. In idle mode, mobile station 5 assumes that the signaling information sent to it has not been processed, so that first analyzer arrangement 20 activates first selector arrangement 25 so that second detection arrangement 35 is connected to first receiving unit 85 and a joint detection distortion removal and detection occur in mobile station 5, as illustrated in FIG. 2 on the side of the mobile station 5 through the letter combination JD at first time $t_1$. Mobile station 5 responds to the "paging" message by sending an "RRC connection request" message to base station 1 over a physical RACH (random access channel), which is an uplink channel accessible to all mobile stations. With this message, mobile station 5 requests the network operator over base station 1 to set up a telecommunications link to the subscriber making the call. The RRC of base station 1 and thus the network operator of the mobile wireless network receive this "RRC connection request" message and cause second message generating arrangement 45 to reply to mobile station 5 in response to this "RRC connection request" message with an "RRC connection setup" message. Mobile station 5 has made itself known in the mobile wireless network through this "RRC connection request" message and may be localized this manner in a radio cell of the mobile wireless network. In this example embodiment of the present invention, this may be the radio cell of base station 1. Multiple mobile stations in the radio cell of base station 1 are supplied with signaling infection over a common FACH (forward access channel). The FACH is a common downlink channel for multiple mobile stations in the radio cell of base station 1. The "RRC connection setup" message is transmitted from base station 1 over the FACH to mobile station 5. Mobile station 5 receives information regarding the mobile wireless network over the "RRC connection setup" message. The "RRC connection setup" message is received in mobile station 5 at a second time $t_2$ and is also subjected to distortion removal and detection by second detection arrangement 35 by the joint detection method. The period of time between first time $t_1$ and second time $t_2$ is used to set up a signaling connection between base station 1 and mobile station 5, which is formed by the FACH in the downlink and by the RACH in the uplink. The RACH is a channel that is accessible to all mobile stations in the radio cell of base station 1. The signaling connection is thus installed completely starting at second time $t_2$ and is then used for further signaling.

A joint predistortion is suitable only for transmission channels that are set up especially for transmission of information between base station 1 and mobile station 5 and not for channels that are accessible to all mobile stations in the radio cell of base station 1, and therefore the joint predistortion method may not be used for exchange of signaling information over the FACH. Therefore, when using the FACH for the transmission of signaling information from base station 1 to mobile station 5, a conventional distortion removal and detection method may be necessary in mobile station 5, e.g., according to the joint detection method. According to the example embodiment, it is assumed that mobile station 5 supports the reception of signals predistorted by the joint predistortion method in that they connect first detection arrangement 30 to first receiving unit 85 and thus make available a strict correlation reception. This means that mobile station 5 is able to receive signals predistorted by the JP method. To inform the mobile wireless network of this capability, mobile station 5 sends a "UE capability info" message to base station 1 after receiving an "RRC connection setup" message. UE stands for "User Equipment" and thus for mobile station 5. The structure of the "UE capability information" message is described, for example, in "RRC Protocol Specification." The "UE capability info" message sent contains among other things a message element having the name "UE mode capability." This message element provides information, among other things, regarding whether mobile station 5 supports TDD and/or FDD (frequency division duplex). The "UE mode capability" message element is also described in "RRC Protocol Specification." It is presented in Table 1 as follows.

TABLE 1

| Parameter | Reference | Type | Comment |
| --- | --- | --- | --- |
| System capability (UMTS, GSM, other) | | | |
| UMTS capability (TDD, FDD) | | | |
| Chip rate capability | | | |
| Radio frequency capability | | | |
| Variable duplex distance capability | | | |

According to the present invention, an additional piece of information is to be inserted into this message element "UE mode capability," signaling to base station 1 whether mobile station 5, which is sending the "UE capability info" message to base station 1, supports a joint predistortion method. The new message element "UE mode capability" supplemented in this manner, is illustrated according to the present invention in Table 2.

TABLE 2

| Parameter | Reference | Type | Comment |
| --- | --- | --- | --- |
| System capability (UMTS, GSM, other) | | | |
| UMTS capability (TDD, FDD) | | | |
| TDD mode (JD/JP) | | | TDD mode only |
| Chip rate capability | | | |
| Wireless frequency capability | | | |
| Variable duplex distance capability | | | |

The supplementary parameter information "TDD mode (JD/JP)" in this example embodiment describes the fact that in TDD mode, mobile station 5 supports detection of signals predistorted by the JP method. The comment "TDD mode only" means that support of this detection is only possible in TDD mode. The JP method may not be used in FDD mode, for example, because the pulse response for the forward channel from base station 1 to mobile station 5 may not be estimated from the reverse channel from mobile station 5 to base station 1 because of the different frequency positions in the forward channel and the reverse channel in FDD mode.

The mobile wireless network then knows on the basis of the new message element "UE mode capability" that mobile station 5 is able to receive JP-predistorted signals from base station 1. The RRC then causes second message generating arrangement 45 to send a reception confirmation of the "UE capability info" message in the form of a "UE capability info confirm" message to mobile station 5. This is also subjected to distortion removal by the JD method and is detected by mobile station 5 because it has not yet been predistorted in base station 1 and sent on the FACH to mobile station 5.

Then the parameters for the actual data transmission over the dedicated transmission channel(s) to be set up for the incoming call are negotiated between mobile station 5 and base station 1 or the mobile wireless network over the FACH and RACH. This is illustrated in FIG. 2 by the double arrow "direct transfer." After successful negotiation and definition of the parameters for the transmission channels to be set up via "direct transfer," base station 1 sends a "RAB setup" (radio access bearer) message to mobile station 5 over the FACH downlink channel. The structure of such a "RAB setup" message is also described, for example, in "RRC Protocol Specification." With the "RAB setup" message, base station 1 notifies mobile station 5 of the configuration for the actual useful data traffic. The configuration is based on the parameters negotiated previously by direct transfer. Both the signaling information received by direct transfer in mobile station 5 and the "RAB setup" message are transmitted from base station 1 to mobile station 5 over the FACH and are thus subjected to distortion removal by the JD method and are detected in mobile station 5. The "RAB setup" message contains, among other things, a message element having the name "downlink time slot info", which notifies mobile station 5 of the time slot to be used for the downlink connection of the transmission channel to be set up. So far, the "downlink time slot info" message element has contained as information only the number of the transmission channel to be set up for the downlink from mobile station 5 in downlink to the time slot to be used, i.e., the information about the time slot in which mobile station 5 will receive data from base station 1 over the transmission channel to be set up in the downlink. The "downlink time slot info" message element is also described, for example, in "RRC Protocol Specification" and is presented in Table 3.

TABLE 3

| Parameter | Reference | Type | Comment | |
|---|---|---|---|---|
| Time slot number | | | Time slot to be used in the downlink (TDD only) | For each time slot |

In the downlink, multiple dedicated transmission channels, each in the form of a time slot allocated to mobile station 5 may be set up between base station 1 and mobile station 5. The comment "for each time slot" in the "downlink time slot info" message element means that the same conditions apply for each allocated time slot.

The "downlink time slot info" message element is an optional message element of the "RAB setup" message.

According to an example embodiment of the present invention, base station 1 also signals in the "downlink time slot info" message element additionally for each allocated time slot information regarding whether the data in this time slot has been predistorted at base station 1 according to the JP method for transmission over the respective transmission channel to be set up. Various allocated time slots may be treated differently, i.e., data of a first allocated time slot is not predistorted according to the JP method in base station 1, and data of a second allocated time slot may not be predistorted in base station 1. The "downlink time slot info" message element may then indicate for each time slot allocated for the downlink of the transmission channel to be set up in each case whether or not the data in this time slot has been predistorted according to the JP method at base station 1. The information regarding whether the data in a time slot allocated for the downlink has been predistorted by the JP method at base station 1 may be combined for multiple allocated time slots in the "downlink time slot info" message element if the data in these time slots is treated the same with regard to processing at base station 1.

Table 4 illustrates an example of a new "downlink time slot info" message element implemented according to an example embodiment of the present invention.

TABLE 4

| Parameter | Reference | Type | Comment | |
|---|---|---|---|---|
| Time slot number | | | Time slot to be used in the downlink (TDD only) | For each time slot |
| JD/JP indicator | | | (TDD only) | For each time slot |

In the example illustrated in Table 4, the "downlink time slot info" message element according to the present invention notifies mobile station 5 that all the time slots allocated to mobile station 5 for the respective transmission channel to be set up between base station 1 and mobile station 5 in the downlink are subjected to JP predistortion with respect to the data transmitted in them in TDD mode only.

The signaling scenario illustrated in FIG. 2 illustrates an example of processing of the data to be sent to base station 1 by the JP method. However, any other types of predistortion or processing of the data to be sent may also be provided at base station 1 to increase the quality of reception of this data at mobile station 5. Accordingly, the type of processing may be indicated in the new message element "UE mode capability" or in the new message element "downlink time slot info".

The "RAB setup" message is received at mobile station 5 at a third time $t_3$. The signaling exchange between base station 1 and mobile station 5 occurs over the FACH in the downlink and over the RACH in the uplink between second time $t_2$ and third time $t_3$, so that the signaling information received at mobile station 5 is still subjected to distortion removal and detected by the JD method in this example. After reception of the "RAB setup" message, mobile station 5 configures its physical layer and sets up a new physical uplink transmission channel from mobile station 5 to base station 1. After successful configuration, mobile station 5 then sends a "RAB configuration complete" message to base station 1 over the newly set-up and configured uplink transmission channel. Mobile station 5 signals to base station 1 via the "RAB configuration complete" message that it has set up this uplink transmission channel from mobile station 5 to base station 1 dedicated specifically to the transmission of data from mobile station 5 to base station 1.

After transmitting the "RAB setup" message, base station 1 accordingly sets up a downlink transmission channel from base station 1 to mobile station 5 dedicated specifically to the transmission of data from base station 1 to mobile station 5. A half duplex TDD mode in which one or more time slots each forms a dedicated uplink transmission channel, and one or more time slots different from those each forms a dedicated downlink transmission channel is thus possible over the two transmission channels set up between base station 1 and mobile station 5. From the data transmitted with the time slots in the respective uplink transmission channel, base station 1 is able to estimate a pulse response of the respective uplink transmission channel this estimated pulse response also representing an estimate of the pulse response of the at least one downlink transmission channel. The estimate may thus be used in base station 1 for JP predistortion of the data to be sent over the at least one downlink transmission channel from base station 1 to mobile station 5. All signaling information and data or useful data received by mobile station 5 from base station 1 then on is received at mobile station 5 over the at least one new downlink transmission channel. This includes both the actual data or useful data of the incoming call and additionally required signaling data. The double arrow labeled as "data exchange" between mobile station 5 and base station 1 characterizes this data exchange over uplink and downlink transmission channels dedicated especially to the connection between base station 1 and mobile station 5. The data to be sent from base station 1 to mobile station 5 is predistorted in base station 1 according to the JP method for at least one of the at least one downlink transmission channel and transmitted to mobile station 5, where it is detected via first detection arrangement 30 by a strict correlation reception.

Figure 3:
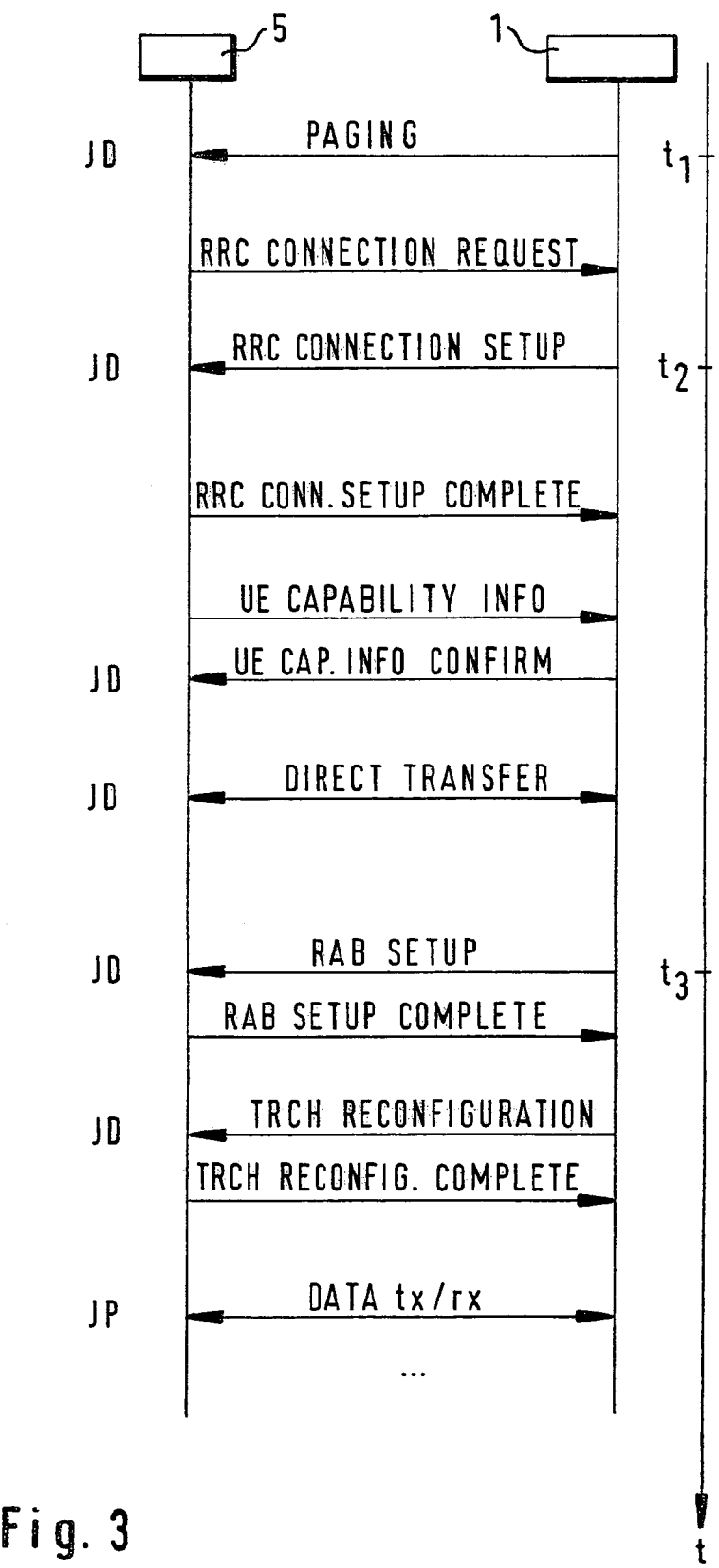
FIG. 3 is a flow chart illustrating the exchange of signaling information according to a second example embodiment of the present invention.

In a second example embodiment of the present invention illustrated in FIG. 3, the signaling scenario described above may be modified so that mobile station 5 is already allocated an uplink channel and a downlink channel at second time $t_2$ via the "RRC connection setup" message from base station 1, the channels being thereafter dedicated only to the exchange of signaling information between base station 1 and mobile station 5. Mobile station 5 acknowledges the "RRC connection setup" message with an "RRC connection setup complete" message sent to base station 1 after already being transmitted to base station 1 over the newly set-up uplink channel and has notified it that this uplink channel has been set up successfully. The uplink and downlink channels already allocated to mobile station 5 at second time $t_2$ for the transmission of the signaling information may thus be differentiated from the uplink and downlink channels allocated to mobile station 5 at third time $t_3$ for the transmission of the useful data of the incoming call.

However, it is also possible for the uplink and downlink channels allocated to mobile station 5 at second time $t_2$ to also be used for the transmission of useful data for the incoming call provided as of third time $t_3$, for which purpose the uplink and downlink channels set up at second time $t_2$ need only be reconfigured at third time $t_3$. FIG. 3 illustrates a second embodiment of the present invention with respect to a variant involving reconfiguration of the uplink and downlink channels.

In the second example embodiment of the present invention, in which uplink and downlink channels are already allocated separately to mobile station 5 at second time $t_2$, the JP method is still used starting at third time $t_3$ and is signaled to mobile station 5 as described in the "RAB setup" message. When using the uplink and downlink channels allocated to mobile station 5 at second time $t_2$ after third time $t_3$ as well, the signaling to mobile station 5 of the JP method used by base station 1 starting at third time $t_3$ may also occur in the required reconfiguration of the uplink and downlink channels, which occurs as illustrated in FIG. 3, after sending the "RAB setup complete" message from mobile station 5 to base station 1 and before exchange of the useful data. The signaling information to be transmitted from base station 1 to mobile station 5 for the reconfiguration is not yet predistorted by base station 1 and thus is still subjected to distortion removal and detected in mobile station 5 according to the JD method. For the reconfiguration, the base station sends a "TRCH reconfiguration" message to mobile station 5. Such a message is described, for example, in "RRC Protocol Specification" referred to above. With this "TRCH reconfiguration" message, the parameters, such as the data rate of the uplink and downlink channels already allocated to mobile station 5 at second time $t_2$ are reconfigured. Mobile station 5 then sends a "TRCH reconfiguration complete" message over an uplink channel reconfigured in this manner, notifying base station 1 of the successful reconfiguration of the uplink channel. Then, the useful data exchange of the incoming call between base station 1 and mobile station 5 may occur over the reconfigured uplink and downlink channels. Since, as described with regard to the first example embodiment of the present invention, in the "RAB setup" message, the "downlink time slot info" message element may already contain information regarding predistortion in base station 1, the "TRCH reconfiguration" message may already be predistorted in the base station, e.g., by the JP method, so that when received in mobile station 5, this message may be detected by strict correlation reception. However, the "downlink time slot info" message element according to another example embodiment of the present invention may also be integrated only into the "TRCH reconfiguration" message, so that the "TRCH reconfiguration" message is still subjected to distortion removal and detected in mobile station 5 by the JD method, and only the subsequent exchange of useful data of the incoming call and optionally additional signaling information to be exchanged may be detected in mobile station 5 through strict correlation reception, because it is predistorted by the JP method in base station 1. It has already been provided that the "TRCH reconfiguration" message (TRCH=transport channel) as described in "RRC Protocol Specification" contains the "downlink time slot info" message element which informs, among other things, mobile station 5 whether processing, e.g., in the form of predistortion of the data to be sent subsequently, occurs in base station 1.

Figure 4:
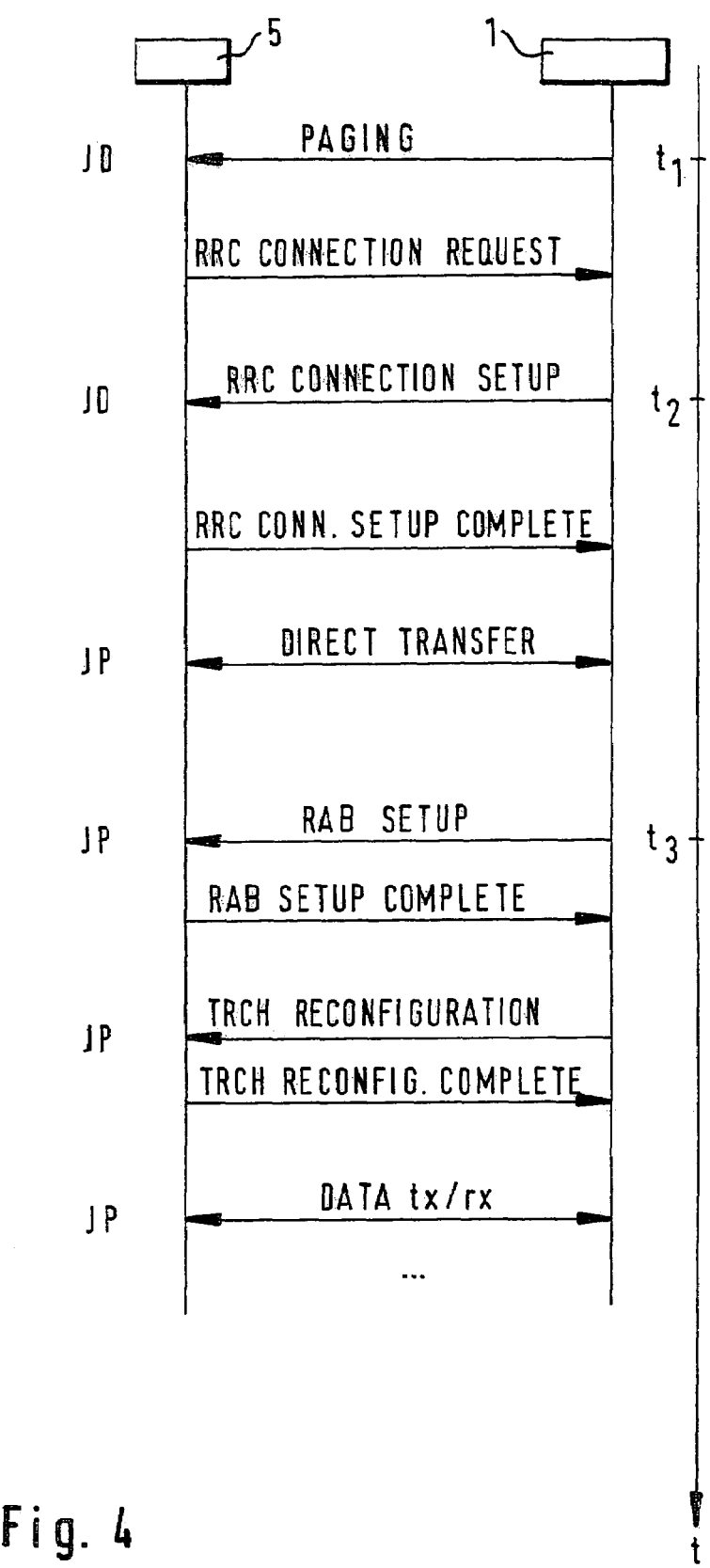
FIG. 4 is a flow chart illustrating the exchange of signaling information according to a third example embodiment of the present invention.

According to the second example embodiment of the present invention, a downlink channel dedicated to the transmission of signaling information from base station 1 to mobile station 5 is already provided starting at second time $t_2$, so that starting at second time $t_2$ the signaling information to be sent from base station 1 may be predistorted by base station 1, so that it may be detected in mobile station 5 by strict correlation reception to save on power consumption in mobile station 5 at the earliest possible time. From the second embodiment, therefore, a third example embodiment of the present invention, as illustrated in FIG. 4, is obtained by the fact that in the "RRC connection request" message, mobile station 5 already transmits a message element having the name "initial UE capability" to base station 1, containing information regarding whether mobile station 5 supports predistortion, e.g., by the JP method, or whether it supports some other processing in base station 1. The "RRC connection request" message is described, for example, in "RRC Protocol Specification" as is the respective optional "initial UE capability" message element. Table 5 shows this "initial UE capability" message element, which was previously not filled with content.

TABLE 5

| Parameter | Reference | Type | Comments |
| --- | --- | --- | --- |

This message element may be modified according to an example embodiment of the present invention as illustrated in Table 6:

TABLE 6

| Parameter | Reference | Type | Comments |
| --- | --- | --- | --- |
| TDD mode (JP/JD) | | | TDD mode only |

In the example embodiment of the present invention according to Table 6, mobile station 5 notifies base station 1 via the new message element "initial UE capability" that it supports predistortion according to the JP method in base station 1. This occurs through strict correlation reception of the received data. The "RRC connection setup" message transmitted at second time $t_2$ from base station 1 over the above-mentioned FACH to mobile station 5 is then not yet transmitted in predistorted form and is subjected to distortion removal and detected in mobile station 5 by the JD method. However, as already described for the "TRCH reconfiguration" message, this "RRC connection setup" message already contains the "downlink time slot info" message element via which base station 1 notifies mobile station 5 that the data to mobile station 5 on the dedicated downlink channel to be set up for further signaling is predistorted in base station 1 according to the JP method. In addition, at least one downlink channel and one uplink channel are allocated to mobile station 5 with the "RRC connection setup" message for further exchange of signaling information. Mobile station 5 acknowledges the "RRC connection setup" message with an "RRC connection setup complete" message sent to base station 1 after already being transmitted to base station 1 over the newly set-up uplink channel, notifying it that this uplink channel has been set up successfully. The exchange of the "UE capability info" message and the "UE capability info confirm" message is no longer required according to the example embodiment of the present invention illustrated in FIG. 4, so that a direct transfer may be performed in the allocated uplink and downlink channels, with the data transmitted from base station 1 to mobile station 5 already being predistorted according to the JP method. This may also be true of all the other signaling data and useful data to be sent from base station 1 to mobile station 5 for the connection to be set up. Thus, no information notifying mobile station 5 of the JP predistortion in base station 1 is necessary even in the "RAB setup" message. However, such information may be necessary in a "TRCH reconfiguration" message which is provided for a reconfiguration of the uplink and downlink channels that is optionally required, because in such a reconfiguration of mobile station 5, new time slots are optionally allocated.

Figure 5:
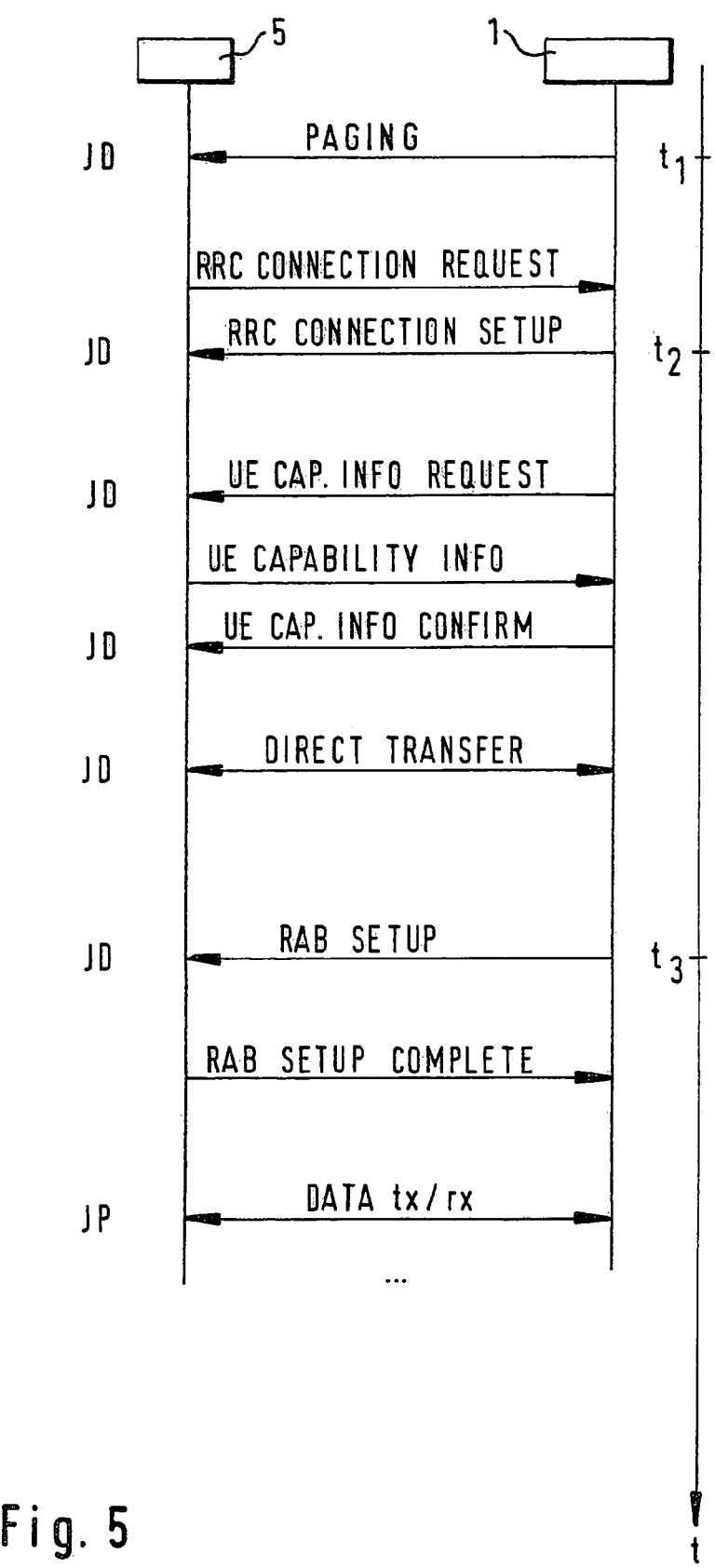
FIG. 5 is a flow chart illustrating the exchange of signaling information according to a fourth example embodiment of the present invention.

FIG. 5 illustrates a fourth example embodiment of the present invention that corresponds to the first example embodiment, with the difference that an additional "UE capability information request" message has been introduced, prompting base station 1 to cause mobile station 5 to send the "UE capability info" message to base station 1. Then, following the "RRC connection setup" message, the "UE capability information request" message is then sent from base station 1 to mobile station 5, where it is optionally also subjected to distortion removal and detected by the joint detection method. The "UE capability information request" message is also described, for example, in "RRC Protocol Specification." In this "UE capability information request" message, information regarding the type of signaling data to be exchanged with the signaling information is normally transmitted to mobile station 5. According to another example embodiment of the present invention, the "UE capability information request" message may also include a message element querying mobile station 5 regarding which types of processing in base station 1 are supported by mobile station 5. Information in this regard may also be transmitted from base station 1 to mobile station 5 in this additional message element or another additional message element of the "UE capability information request" message, indicating which types of processing of data to be sent are possible in base station 1. In the example described here this example embodiment of the present invention, for example, it may be indicated in such an additional message element that the four types of processing by base station 1 as described above are possible, if the lack of processing is considered a type of processing. In particular, the JP method may be indicated for the possible predistortion in base station 1 in this example embodiment of the present invention. The additional message element having the information regarding the types of processing of the data to be sent that are supported by base station 1 then corresponds to, contains or is contained in the first message according to the example embodiment illustrated in FIG. 1.

The additional message element(s) may optionally also already be sent from base station 1 to mobile station 5 with the "RRC connection setup" message to save on the "UE capability information request" message. Since the "downlink time slot info" message element is already transmitted in the "RRC connection setup" message, the additional message element(s) may also be transmitted as part of the "downlink time slot info" message element, so that no additional message elements are necessary in the "RRC connection setup" message.

The message elements of the first three example embodiments described above, which are transmitted from base station 1 to mobile station 5 and contain information regarding whether the data to be sent from base station 1 to mobile station 5 is processed in base station 1, thus corresponds to, contains or is contained in the third message according to the example embodiment of the present invention illustrated in FIG. 1. The message elements transmitted from mobile station 5 to base station 1 in the first three example embodiments described above and containing information regarding whether processing in base station 1 of the data to be sent from base station 1 is supported by mobile station 5 or which type(s) of such processing in base station 1 is/are supported by mobile station 5 corresponds to, contains or is contained in the second message according to the example embodiment of the present invention illustrated in FIG. 1.

In the four example embodiments described above, it has been assume for only the sake of the example that processing in base station 1 occurs according to the JP method, for example. However, any desired of processing of the data to be sent in base station 1 may also be signaled via the aforementioned message element. The signaling may be implemented by setting one or more bits in the corresponding message element. It possible that a set bit in the third message stands for a special type of processing of the data to be sent, performed by base station 1, whereas not setting this bit stands for this type of processing not being performed in base station 1. A similar agreement may be made for the first message. A set bit in the second message may be agreed that a specific type of processing of the data to be sent is supported by mobile station 5. Not setting this bit may then indicate that this type of processing is not supported by mobile station 5. A set bit in the first message may indicate that a specific type of processing of the data sent is supported by base station 1. Not setting this bit may then indicate that this type of processing is not supported by base station 1.

In addition, the first message at base station 1 may be sent continuously or at regular intervals to all mobile stations belonging to the mobile wireless network with general system information, such as, for example, that described in "RRC Protocol Specification." This first message may contain an additional message element that indicates to the mobile stations whether and which type or types of processing of data to be sent is/are supported by the mobile wireless network or base station 1 belonging to the mobile wireless network. This additional message element may be formed according to Table 6, but is then sent from base station 1 and is then called, for example, a "base station capability information" message element.

Figure 6:
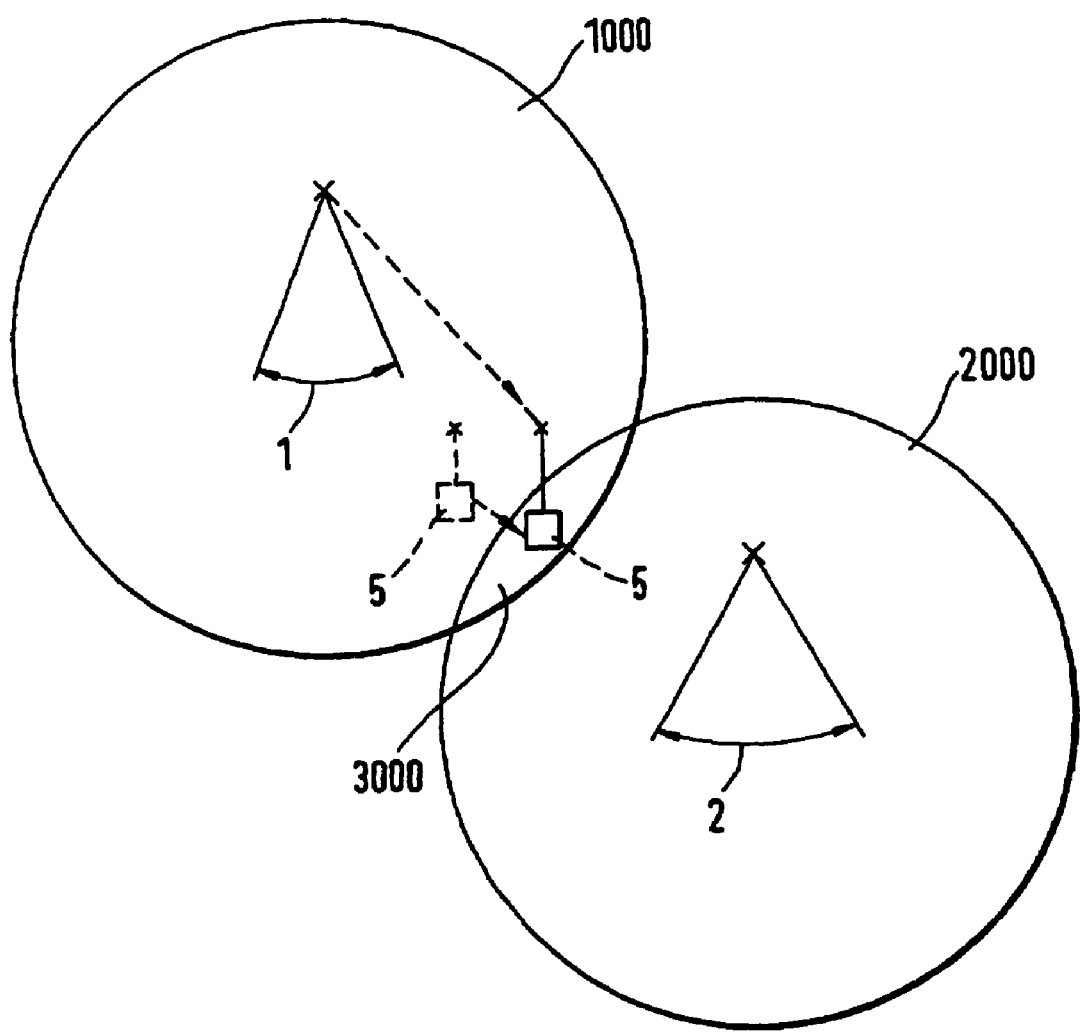
FIG. 6 illustrates an arrangement of an example slave station according to the present invention for use in a cellular mobile wireless network before transmission from a master station to another master station.

In FIG. 6, a portion of the mobile wireless network is illustrated, with master station 1 representing a first base station that spans a first radio cell 1000 and with another master station 2 being provided representing a second base station and spanning a second radio cell 2000, with first radio cell 1000 and second radio cell 2000 being in proximity to one another and overlapping slightly in a transitional area 3000. As illustrated in FIG. 6, mobile station 5 has moved into transitional area 3000 within first radio cell 1000. Master station 1 then ascertains that mobile station 5 is able to exchange with second base station 2 signals having a higher reception quality than with first base station 1. Therefore, first base station 1 prepares for a transfer by second base station 2 of the link that has been or is to be set up. Such a transfer is known as a handover. In preparation for and may be exchanged between first base station 1 and second base station 2. It is possible to provide for first base station 1 to transmit the third message to mobile station 5 with this signaling information, which however contains information regarding whether processing of the data to be sent is performed after the handover in second base station 2 to increase the reception quality of this data at mobile station 5, and if so, which type(s) of processing is/are used. Thus, in the case of a handover before the change from first base station 1 to second base station 2, i.e., before setting up a dedicated transmission channel between second base station 2 and mobile station 5, mobile station 5 may decide in the manner described above how it may perform distortion removal and detection of the data sent by second base station 2 to be able to guarantee optimum data reception in which the power consumption is minimized. The possible types of processing of the data to be sent by second base station 2 thus correspond to the types supported by first base station 1, for example, may also be different. It is also possible for just one type of processing to be supported by second base station 2.

What is claimed is:

1. A method of transmitting signaling information between a transmitting station and a receiving station, comprising the step of:
   transmitting a first message with the signaling information from the transmitting station to the receiving station, the first message including information regarding whether data to be sent is processed in an additional transmitting station, the additional transmitting station being successively assigned to the receiving station to increase reception quality of the data to be sent at the receiving station, in accordance with measures relating to a transmission channel between the receiving station and at least one of the transmitting station and the additional transmitting station.

2. The method according to claim 1, wherein the transmitting station includes a base station.

3. The method according to claim 1, wherein the receiving station includes mobile station.

4. The method according to claim 1, wherein the first message includes information regarding whether data to be sent is processed in the one of the transmitting station and the additional transmitting station in accordance with a change of the receiving station from a first radio cell to a second radio cell of a radio network.

5. The method according to claim 1, wherein information regarding a type of processing of the data to be sent is transmitted in the transmitting step with the third message from the transmitting station to the receiving station.

6. The method according to claim 1, wherein the first message is transmitted in the transmitting step, with regard to a single transmission channel for transmission of the data to be sent.

7. The method according to claim 1, wherein the first message is transmitted in the transmitting step with regard to multiple transmission channels for transmission of the data to be sent when a type of processing in the multiple transmission channels is the same.

8. The method according to claim 1, wherein information regarding whether the data to be sent from the one of the transmitting station and the additional transmitting station is emitted by one of a single antenna and multiple antennas is transmitted in the transmitting step with the third message.

9. The method according to claim 1, wherein information regarding whether the data to be sent is predistorted in one of the transmitting station and the additional transmitting station is transmitted in the transmitting step with the first message.

10. The method according to claim 9, wherein information regarding whether predistortion is performed as a function of an estimated pulse response of at least one time slot transmission channel between the receiving station and one of the transmitting station and the additional transmitting station is transmitted in the transmitting step with the first message.

11. The method according to claim 1, further comprising the step of:
   transmitting a second message from the receiving station to the transmitting station, the second message including information regarding which types of processing of the data to be sent by the transmitting station are supported by the receiving station to detect the data to be sent, the second message including the signaling information before the first message.

12. The method according to claim 11, further comprising the step of:
   processing the data to be sent in the transmitting station as a function of the second message in a manner supported by the receiving station for detecting the data to be sent.

13. The method according to claim 12, further comprising the step of:
   transmitting the processed data to be sent in a transmission channel dedicated only to a connection between the transmitting station and the receiving station.

14. The method according to claim 12, wherein the signaling information is transmitted in the transmitting step in a processed form from the transmitting station to the receiving station at an earliest when, in accordance with the second message, the types of processing supported by the receiving station are known by the transmitting station, the processing step occurring in a manner supported by the receiving station, and when the first message has been transmitted to the receiving station.

15. The method according to claim 1, further comprising the step of:
   transmitting a third message from the transmitting station to the receiving station, the third message including information regarding which ones of at least one type of processing of the data to be sent are supported by the transmitting station and the signaling information from the transmitting station to the receiving station, the third message transmitted in the third message transmitting step when the first message is transmitted in the first transmitting step.

16. The method according to claim 15, wherein the third message is transmitted in the third message transmitting step in a transmission channel accessible to a plurality of receiving stations.

17. The method according to claim 1, wherein the signaling information is transmitted in the transmitting step in a processed form at an earliest after transmission of the first message to the receiving station from the one of the transmitting station and the additional transmitting station, and the signaling information is transmitted in a transmission channel accessible to a plurality of receiving stations.

18. A receiving station, comprising:
   a first evaluation arrangement configured to analyze a first message from a transmitting station to determine whether data to be sent to the receiving station from one of the transmitting station and an additional transmitting station successively assigned to the receiving station has been processed by one of the transmitting station and the additional transmitting station to increase a reception quality in accordance with measures relating to a transmission channel between the receiving station and at least one of the transmitting station and the additional transmitting station;
   wherein the first message includes information regarding whether data to be sent is processed by the additional transmitting station.

19. The receiving station according to claim 18, wherein the transmitting station includes a base station.

20. The receiving station according to claim 18, wherein the first evaluation arrangement is configured to analyze the first message to determine a type of processing that has been used by one of the transmitting station and the additional transmitting station on the data to be sent.

21. The receiving station according to claim 15, further comprising a first selection arrangement configured to select, as a function of the first message analyzed by the first evaluation arrangement, a detection arrangement configured to detect the data to be sent by one of the transmitting station and the additional transmitting station.

22. The receiving station according to claim 18, further comprising a first message generation arrangement configured to generate a second message as a function of ones of at least one type of processing of data to be sent by the transmitting station that are supported by the receiving station and to transmit the second message to the transmitting station.

23. The receiving station according to claim 22, wherein the first evaluation arrangement is configured to analyze a third message from the transmitting station to determine which ones of at least one type of processing of signals to be sent are supported by the transmitting station, and the first evaluation arrangement is configured to check whether the ones of at least one type of processing supported by the transmitting are supported by the receiving station, and the first evaluation arrangement is configured to activate the third message generation arrangement so that at least one type of processing supported by both the transmitting station and the receiving station is indicated in the second message.

24. A transmitting station, comprising:
   a message generation arrangement configured to generate a first message including information regarding whether data to be sent is processed in an additional transmitting station, the additional transmitting station being successively assigned to a receiving station to increase a reception quality of the data to be sent at the receiving station in accordance with measures relating to a transmission channel between the receiving station and at least one of the transmitting station and the additional transmitting station, the message generation arrangement configured to transmit the first message to the receiving station.

25. The transmitting station according to claim 24, wherein the receiving station includes a mobile station.

26. The transmitting station according to claim 24, wherein the message generation arrangement is configured to indicate in the first message a type of processing performed on the data to be sent in one of the transmitting station and the additional transmitting station.

27. The transmitting station according to claim 24, wherein the message generation arrangement is configured to generate, before transmission of the first message, a third message including information regarding which ones of at least one type of processing of data to be sent by the transmitting station are supported by the transmitting station, the message generation arrangement configured to transmit the third message to the receiving station.

28. The transmitting station according to claim 24, further comprising an evaluation arrangement configured to analyze a second message received from the receiving station to determine which ones of at least one type of processing of signals to be sent are supported by the receiving station, the second evaluation arrangement configured to check whether the ones of the at least one type of processing supported by the receiving station are supported by the transmitting station, the evaluation arrangement configured to select at least one type of processing that is supported by both the transmitting station and the receiving station, the evaluation arrangement configured to activate the message generation arrangement so that the at least one selected type of processing is indicated in the first message, and the evaluation arrangement configured to activate a processing unit to process the data to be sent in accordance with the at least one selected type of processing.

29. The transmitting station according to claim 28, wherein the processing unit is configured to perform a predistortion.

30. The transmitting station according to claim 29, wherein the predistortion includes a joint predistortion.

31. The transmitting station according to claim 28, wherein the processing unit is configured to emit the signals to be sent over multiple antennas.

32. A method of transmitting a message element from a transmitting station to a receiving station, comprising the step of:
   transmitting information with the message element regarding whether data to be sent is processed by an additional transmitting station, the additional transmitting station being successively assigned to the receiving station to increase a reception quality at the receiving station in accordance with measures relating to a transmission channel between the receiving station and as least one of the transmitting station and the additional transmitting station.

33. The method according to claim 32, wherein the transmitting station includes a base station.

34. The method according to claim 32, wherein the receiving station includes a mobile station.

35. The method according to claim 32, wherein the method includes an exchange of signaling information.

36. The method according to claim 32, wherein information regarding which ones of at least one type of processing are used on the data to be sent is transmitted in the transmitting step with the message element.

37. A method of transmitting a message element from a transmitting station to a receiving station, comprising the step of:

transmitting information with the message element regarding one of which one of processing of signals to be sent and which ones of at least one type of processing of signals to be sent are supported by one of the transmitting station and an additional transmitting station successively assigned to the receiving station to increase a reception quality at the receiving station in accordance with measures relating to a transmission channel between the receiving station and at least one of the transmitting station and the additional transmitting station.

38. The method according to claim 37, wherein the transmitting station includes a base station.

39. The method according to claim 37, wherein the receiving station includes a mobile station.

40. The method according to claim 37, wherein the method includes an exchange of signaling information.

41. A method of transmitting a message element from a receiving station to a transmitting station, comprising the step of:

transmitting information with the message element regarding which types of processing of signals to be sent by one of the transmitting station and an additional transmitting station successively assigned to the receiving station are supported by the receiving station in a detection of the signals to be sent to increase a reception quality at the receiving station.

42. The method according to claim 41, wherein the receiving station includes a mobile station.

43. The method according to claim 41, wherein the transmitting station includes a mobile station.

44. The method according to claim 41, wherein the method includes an exchange of signaling information.

* * * * *

UNITED STATES PATENT AND TRADEMARK OFFICE
CERTIFICATE OF CORRECTION

| | | |
|---|---|---|
| PATENT NO. | : 6,983,147 B1 | Page 1 of 2 |
| APPLICATION NO. | : 10/088146 | |
| DATED | : January 3, 2006 | |
| INVENTOR(S) | : Martin Hans et al. | |

It is certified that error appears in the above-identified patent and that said Letters Patent is hereby corrected as shown below:

Column 3, line 65, change "is configured a wireless channel." to --is configured as a wireless channel.--

Column 4, line 35, change "a second receiving unit" to --over a second receiving unit--

Column 4, lines 43-44, change "may each be a configured" to --may each be configured as--

Column 5, line 43, change "However, it is also" to --However, it may also be possible.--

Column 5, line 44, change "may to be set" to --to be set--

Column 6, line 49, change "betragung,"," to --bertragung,"--

Column 7, line 29, change "for second message" to --for a second message--

Column 7, line 66, change "Second analyzer arranges" to --Second analyzer arrangement--

Column 7, line 67, change "ascertain that" to --ascertains that--

Column 8, line 23, change "lead to" to --leads to--

Column 8, line 28, change "the third message this" to --the third message, this--

Column 9, line 11, change "the fact that" to --regarding the fact that--

Column 9, line 25, change "the data sent to be sent." to --the data to be sent.--

Column 9, line 66, change "to be sent be only routed" to --to be sent to be only routed--

Column 15, line 10, change "transmission channel this" to --tranmission channel, this--

Column 18, lines 56-57, change "It has been assume" to --it has been assumed--

UNITED STATES PATENT AND TRADEMARK OFFICE
CERTIFICATE OF CORRECTION

PATENT NO. : 6,983,147 B1
APPLICATION NO. : 10/088146
DATED : January 3, 2006
INVENTOR(S) : Martin Hans et al.

It is certified that error appears in the above-identified patent and that said Letters Patent is hereby corrected as shown below:

Column 19, line 2, change "agreed that" to --agreed upon such that--

Signed and Sealed this

Twenty-fifth Day of July, 2006

JON W. DUDAS
*Director of the United States Patent and Trademark Office*

Disclaimer

6,983,147 B2 - Martin Hans; Josef Laumen, both of Hildesheim (DE); Mark Beckmann, Hameln (DE); Volker Beichmann, Hildesheim (DE). METHOD OF TRANSMITTING SIGNALING INFORMATION, A MASTER STATION, A MOBILE STATION AND MESSAGE ELEMENTS. Patent dated January 3, 2006. Disclaimer filed May 18, 2021, by the IPCOM GMBH & CO KG.

I hereby disclaim the following complete claims 37-40 of said patent.

*(Official Gazette, September 13, 2022)*